United States Patent [19]
Wojtowicz et al.

[11] 3,779,546
[45] Dec. 18, 1973

[54] VACUUM WHEEL DOCUMENT DIRECTION CHANGING DEVICE

[75] Inventors: Edward A. Wojtowicz, Bryn Mawr; James R. Hunter, Chadds Ford; S. James Lazzarotti, Broomall, all of Pa.

[73] Assignee: Burroughs Corporation, Detroit, Mich.

[22] Filed: Dec. 11, 1972

[21] Appl. No.: 313,828

[52] U.S. Cl. ............ 271/196, 271/DIG. 1, 271/95, 271/184
[51] Int. Cl. ............................................ B65h 29/24
[58] Field of Search ............... 271/74, 95, DIG. 1, 271/96, 108; 198/25

[56] References Cited
UNITED STATES PATENTS
2,810,575  10/1957  Holmen .............................. 271/95
3,041,065  6/1962  Kretz .............................. 271/95 X Primary Examiner—Richard A. Schacher
Attorney—Paul W. Fish et al.

[57] ABSTRACT

Apparatus is described which comprises a continuously rotating wheel assembly having disposed thereon one or more vacuum platens for transporting documents in aidrection changes. The apparatus is effective in changing the direction or the direction and orientation of documents, such as mail pieces, being transported in single file at high speed. For example, the device may be employed to abruptly change the direction of a moving document approximately through 90° within substantially the same plane. Additionally, the last-mentioned document may enter the device in a direction parallel to one of its axes (directed along the length of its flat surface) and may exit the device in a direction parallel to the other of its axes (directed along its width). Depending upon the application, the device platens may be arranged to provide a variety of document exit orientations along with a choice of substantially planar direction changes.

10 Claims, 7 Drawing Figures

VACUUM WHEEL DOCUMENT DIRECTION CHANGING DEVICE

CROSS REFERENCE TO RELATED APPLICATIONS

To the extent that application Ser. No. 302,022, "Document Direction-Changing Device" by Edward A. Wojtowicz et al relates to the same general purpose of changing the direction and orientation of a moving stream of documents, it is cross-referenced herein. The reference application and the present one are assigned to a common assignee.

BACKGROUND OF THE INVENTION

Document processing systems often require that the direction or direction and orientation of the moving document itself be changed, usually within the same or parallel planes. For documents travelling at high velocity and rate of flow and having a considerable range of parameters for length, width, thickness and weight, the problem of effecting a direction or orientation change within a limited distance of travel becomes rather acute.

In the referenced application, a direction-changing device is described in which documents enter on a first set of moving belts, are stripped therefrom by a cam-operated pusher assembly, and are thrust upon a second set of moving belts having a desired physical orientation with respect to the first set. In general, the device provides for direction changes from horizontal to vertical, or vice versa, and lengthwise to widthwise document orientation in the direction of motion, or vice versa.

The vacuum wheel direction changer of the present invention differs appreciably in structure and mode of operation from the device of the referenced application. Depending upon the application serviced thereby, the present changer has the capability of providing a large number of planar directional changes and document orientations. Another distinction of the present device is that the position of the document trailing reference edge does not vary at the exiting position, that is, it is not a function of the document mass. As such, the present invention provides an extremely versatile, yet relatively uncomplicated mechanism suitable for a wide variety of applications.

SUMMARY OF THE INVENTION

The present mechanism is a harmonic deceleration and acceleration device that functions in the following manner. A single stream of documents, such as mail pieces, moving at a constant velocity, enter a continuously rotating wheel assembly having at least one platen, but usually a plurality of platens, disposed thereon. In some applications, the platens may be affixed directly to the wheel and not be capable of independent rotation. More often, however, the platens are articulated to obtain a desired orientation of the document. In this case, they are capable of rotation about their centers and are interconnected to one another and to the wheel by means such as timing belts and pulleys to maintain the desired platen and document orientation. The wheel is driven with an angular velocity which produces a platen tangential velocity equal to the document velocity at the input point of the device. Vacuum forces applied through the face of the platen secure the document thereto at the input point. After the desired direction change, effected by the angular rotation of the wheel; and the rotational orientation of the document itself approximately about its center of gravity, effected by the platen articulation, the vacuum force is terminated and the document permitted to exit the device. Other features and advantages of the invention will become apparent in the detailed description which appears hereinafter.

DESCRIPTION OF THE PREFERRED EMBODIMENTS

Figure 1:
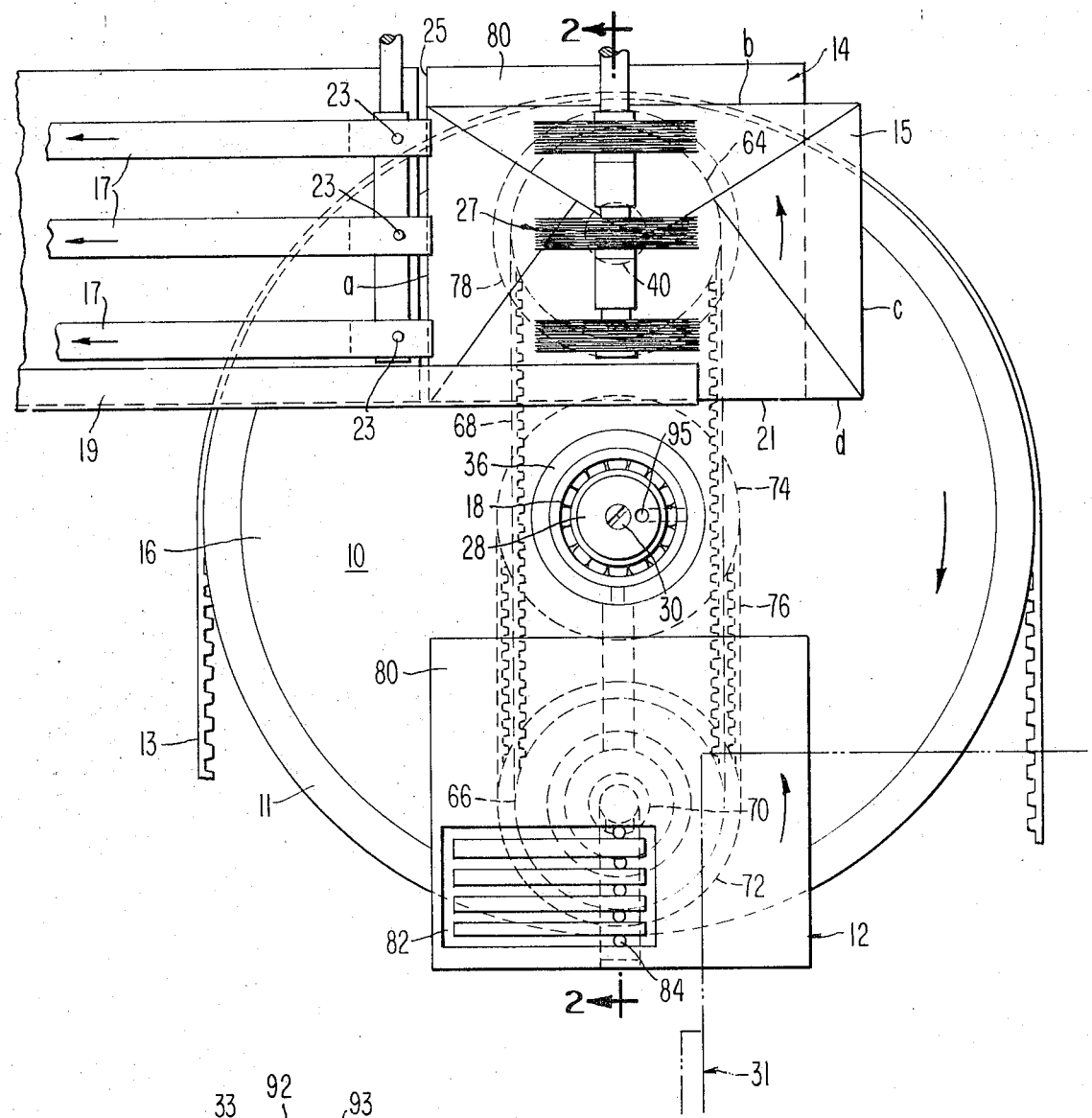
FIG. 1 is a front view of the vacuum wheel direction-changing device illustrated at the document 0° or "input" point of its rotational cycle.

The drawing illustrates the present invention in the performance of a representative direction-changing operation. The documents or mail pieces are initially assumed to be moving in a horizontal direction along their lengthwise or horizontal axes. At a predetermined point in their travel, the present device effects a substantially 90° direction change in their motion as they are made to assume a vertical (downward) direction along their widthwise or vertical axes. It should be understood that the foregoing direction change from horizontal to downward vertical motion as performed by the arrangement of the apparatus described hereinafter, has been chosen solely for purposes of illustrating an application of the invention, but that the invention is not to be construed as being so limited. Depending upon the specific application of the present device, a variety of direction changes and document orientations may be effected thereby. Accordingly, the techniques and apparatus described herein may be modified as required by persons skilled in the art without departing from the true spirit of the invention.

Before proceeding with a description of the operation of the vacuum wheel direction-changing device, the structural details of the device will be described with specific reference to FIG. 2 and more general reference to FIGS. 1 and 3 for the components illustrated therein. The direction changer device is comprised of a wheel assembly 10 and a pair of platens 12 and 14 spaced 180° apart. The wheel assembly includes wheel 16 which is supported by two ball bearings 18 and 20 mounted on a hollow stationary shaft 22 supported by member 24. The two bearing inner races are clamped against shoulder 26 of shaft 22 by end cap 28 and screw 30 through a slidable sleeve 32, which is constrained on shaft 22 by pin 29. The outer race of bearing 20 is clamped against shoulder 34 of housing 36 by a plate 38. The outer race of bearing 18 does not bear against a shoulder, but rather is free to "float" in the inner diameter of housing 36. This configuration permits wheel 16, along with housing 36, to rotate about shaft 22 and sleeve 32, while at the same time being retained securely in the shaft's axial direction.

The platens 12 and 14 are similar to each other and the following description applies to either one, unless otherwise noted. Platen 14 is press-fitted onto a hollow shaft 40 which permits it to be rotatably mounted in sealed ball bearings 42 and 44. The inner races of bearings 42 and 44 are clamped against shoulder 46 on shaft 40 by pin 48 and screw 50 through a slidable spacer 52 constrained on shaft 40 by pin 33. Pin 48 is loosely mounted in slot 54 to permit clamping. The outer race of bearing 44 is clamped against shoulder 56 in housing 58 by a plate 60. Housing 58 is securely fastened by screws to wheel 16 in the same manner as housing 36. This bearing arrangement permits platens 12 and 14 to be rotatably mounted on the rotating wheel 16 and axially spaced away from the wheel by a distance 62.

The platens 12 and 14 are interconnected to rotate together by virtue of toothed pulleys 64 and 66 and a toothed belt 68. Pulleys 64 and 66 are securely fastened to shafts 40 (of platen 14) and 70 (of platen 12) respectively. Rotating shaft 70 is also interconnected to stationary shaft 22 by toothed pulleys 72 on shaft 70 and 74 on shaft 22 which are linked by toothed belt 76. Pulley 74 is fastened to shaft 22 by screw 75. Balancing pulley 78 is identical in physical characteristics to pulley 72 and is mounted on shaft 40 to provide a centrifugally balanced system as may be required in high speed applications. Pulley 78 is not linked by a belt.

This system of articulating platens 12 and 14 permits the orientation of these platens, as seen particularly in FIG. 1, to be maintained through a 360° rotation of wheel 16. Essentially, when wheel 16 rotates through any given angle in a clockwise direction, platens 12 and 14 rotate in a counterclockwise direction through an equal angle. The equal rotations are due to pulleys 72 and 74 having equal numbers of teeth. Similarly, pulleys 64 and 66 are also designed to have equal numbers of teeth.

As also depicted in FIG. 1, the face of each platen includes a layer of resilient material 80 such as rubber to provide a high frictional surface. The rubber facing contains interconnected elongated slots 82 to permit a vacuum to exert a holding force distributed over an extended area of the side of the document attached to the platen. The vacuum pressure is brought to bear on the grooved area by a series of interconnected passages. Considering platen 14, air enters into the five ports 84 and is directed through hole 86 drilled into the platen 14; then through hole 88 in a wall of shaft 40; through the hollow center portion 89 of shaft 40; through opening 90 in shaft 40 and spacer 52; through the annular space 97 between the ball bearings; then through opening 91 in housing 58, into a radial passageway 92 in the wheel 16, which has at one of its extremities a rectangular-shaped hole 93 in housing 36.

Figure 3:
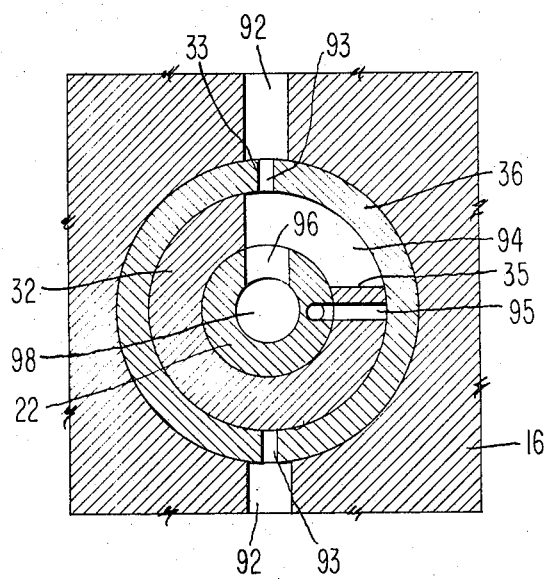
FIG. 3 is a section view taken along lines 3—3 of FIG. 2 illustrating the vacuum porting arrangement of the device as it appears at the document "input" point.

With particular reference to FIG. 3 for the condition wherein platen 14 is at the "input" point, that is, the point at which the platen and document coincide positionally, passageway 92 (including rectangular aperture 93 in housing 36) is in alignment with a sector-like opening 94 in sleeve 32. An air passage then exists through opening 94 and aperture 96 in the wall of shaft 22. Sleeve 32 is aligned slidably on shaft 22 by pin 29 to permit opening 94 to be properly positioned with respect to aperture 96. The path of air flow is then through aperture 96 into the hollow center portion 98 of shaft 16, and then to vacuum pump 100.

The wheel 16 is driven by toothed pulley 11 attached on its periphery. A toothed belt 13 links this pulley to a drive motor, not shown, at the proper ratio to obtain desired platen peripheral speeds.

The operation of the direction-changing device of the present invention may be described with general reference to FIGS. 1–4 inclusive. In FIG. 1 the documents 15 whose direction is to be altered are assumed to be transported to the direction changer in a direction parallel to their horizontal or lengthwise axes, by positively-driven flighted horizontal synchronizer belts 17, operating in conjunction with a document supporting member in the form of channel 19.

The documents arrive at the position of platen 14 with their lower horizontal edge, d, aligned with the platen horizontal reference edge 21. The peripheral velocity of the platen is chosen to be identical to the linear velocity of the incoming document on the horizontal belts 17, which velocity may be of the order of 192 inches per second for a 12-document per second input rate. The documents are pushed by the flight pins 23 of the horizontal belts 17 to arrive at the direction changer synchronously, that is, with their trailing edges aligned with the platen vertical reference edge 25 at the "input" or 0° position. A vacuum force is applied through the platen ports 84 to the flat surface of the document at the 0° position to secure the document to the platen. The attachment of the document is assisted by a vertically rotating brush assembly 27 which assures intimate contact of document-to-platen at the point of vacuum application. The velocity of both platen and document are equal at this time and no relative motion exists during the initial contact of the document with the platen. The vacuum force applied to the document must be sufficient to counter the effects of centrifugal and possible coriolis forces which are felt at the center of gravity of the document during rotation. Thus, the vacuum force is chosen to be large enough to prevent relative motion of the document and platen during the desired angular rotation of the wheel 16, which in the present example is 90°.

As seen in FIG. 1, platen 12 is displaced 180° from platen 14 and plays no part in the instant direction changing cycle. However when wheel 16 rotates clockwise another 180°, platen 12 will arrive at the position presently occupied by platen 14 at the precise instant to receive the next document, thereby initiating a succeeding cycle.

At the 0° "input" attachment point, the document 15 is at full horizontal velocity as it leaves the belts 17 and has zero velocity in the vertical direction. During the next 90° rotation of wheel 16, the horizontal velocity of the document decelerates to zero and concurrently accelerates to the desired output vertical velocity in a manner governed by the harmonic motion equations.

FIGS. 4–7 inclusive relate generally to the document "output" point in the rotational cycle of wheel 16. FIG.

Figure 2:
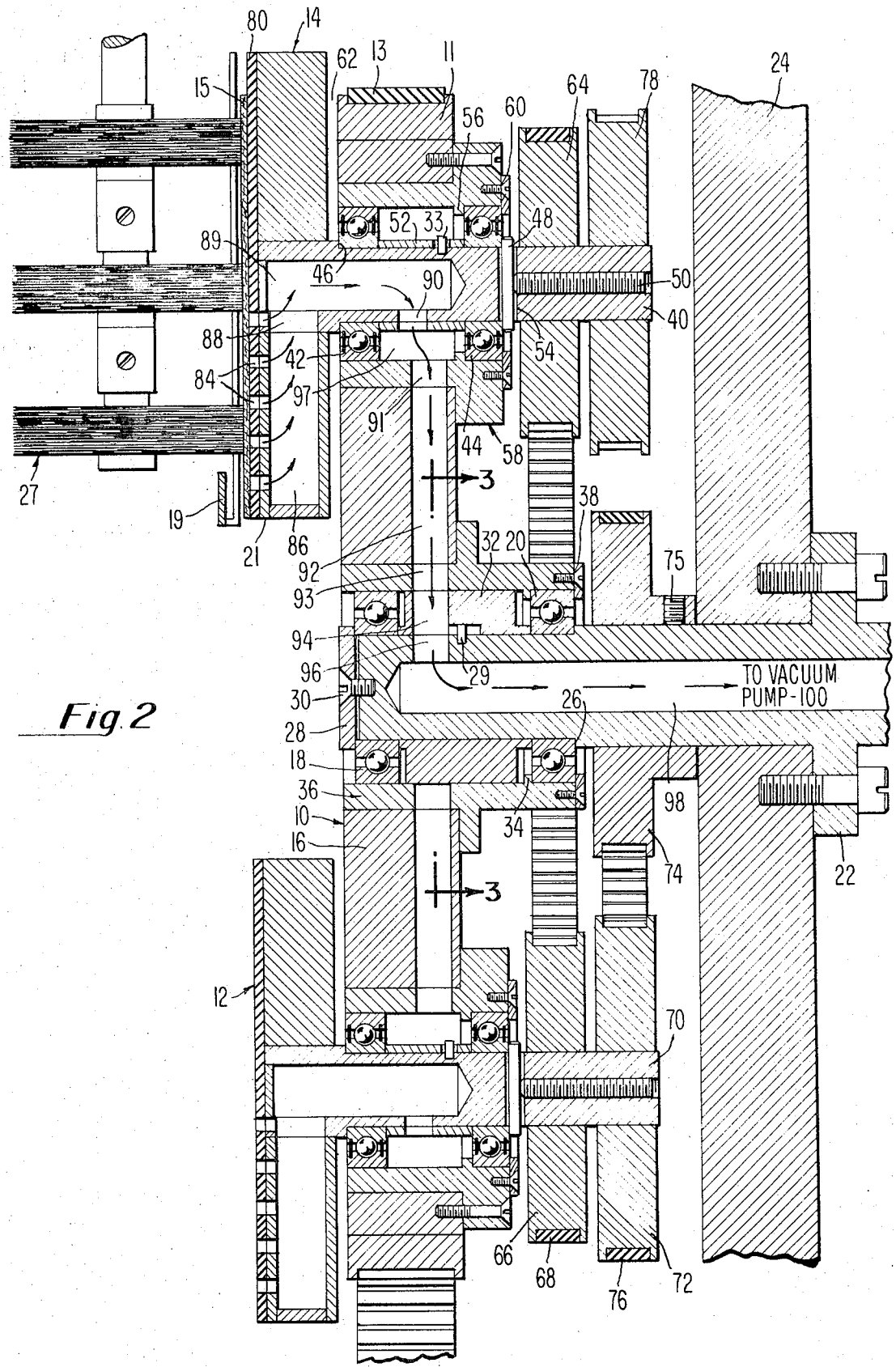
FIG. 2 is an enlarged section view taken along lines 2—2 of FIG. 1 depicting the structural details of the device.
Figures 4, 5:
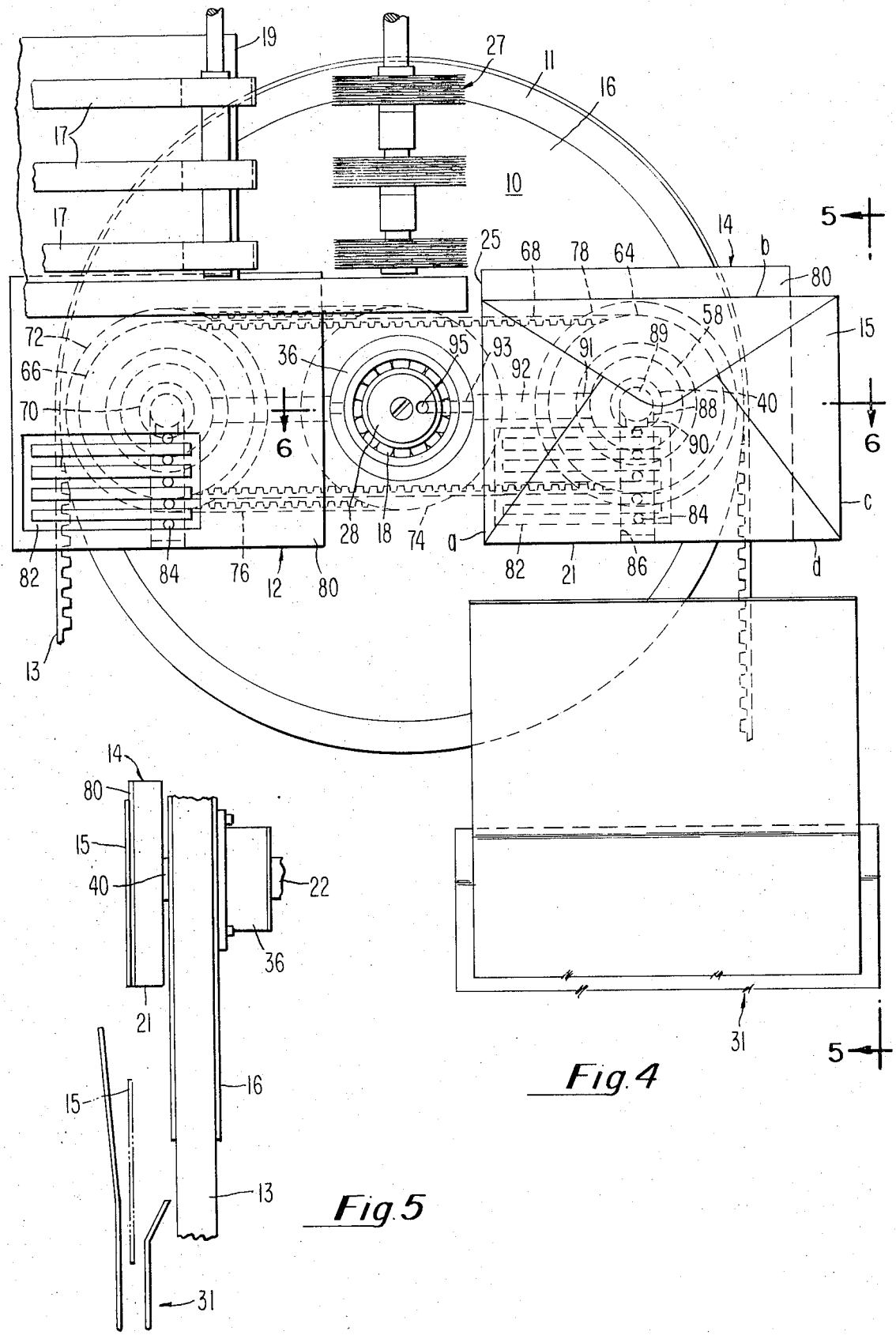
FIG. 4 is another front view of the direction-changing device illustrated at the document "output" point which is chosen for purpose of example to be 90° clockwise from the "input" point depicted in FIG. 1.
FIG. 5 is a partial view taken along lines 5—5 of FIG. 4 to better illustrate one mode of document output handling.

4 illustrates the instant condition for release of the document, that is, the wheel 16 and the platens 12 and 14 have rotated 90° from the condition depicted in FIGS. 1-3 inclusive. Due to the aforementioned arrangement of timing belts and pulleys, the platen 14 and the document 15 have rotated 90° counterclockwise as wheel 16 rotated 90° clockwise. The vertical orientation of the document 15 has remained the same.

At the 90° "output" point, the vacuum path from the pump 100 to the ports 84 in the face of the platen 14 is closed by virtue of the misalignment of passageway 92 (and aperture 93) with sector 94. This condition is better depicted in FIGS. 6 and 7 which will be considered hereinafter. Suffice to say at this time, that vacuum pressure is released on document 15, allowing it to leave the platen 14 with the desired vertical velocity. Depending upon particular applications, the exiting document may be handled in different ways. By way of example in FIG. 4, and as seen more clearly in FIG. 5, chute-like member 31 positioned below the platen 14 accepts the downward vertically moving document. Although not shown in the Figures, a downward moving flighted belt disposed in proper relationship to the chute and moving at the same velocity as the document, may be utilized to contact the document and drive it to a typical vertical sorting receptacle.

Figure 6:
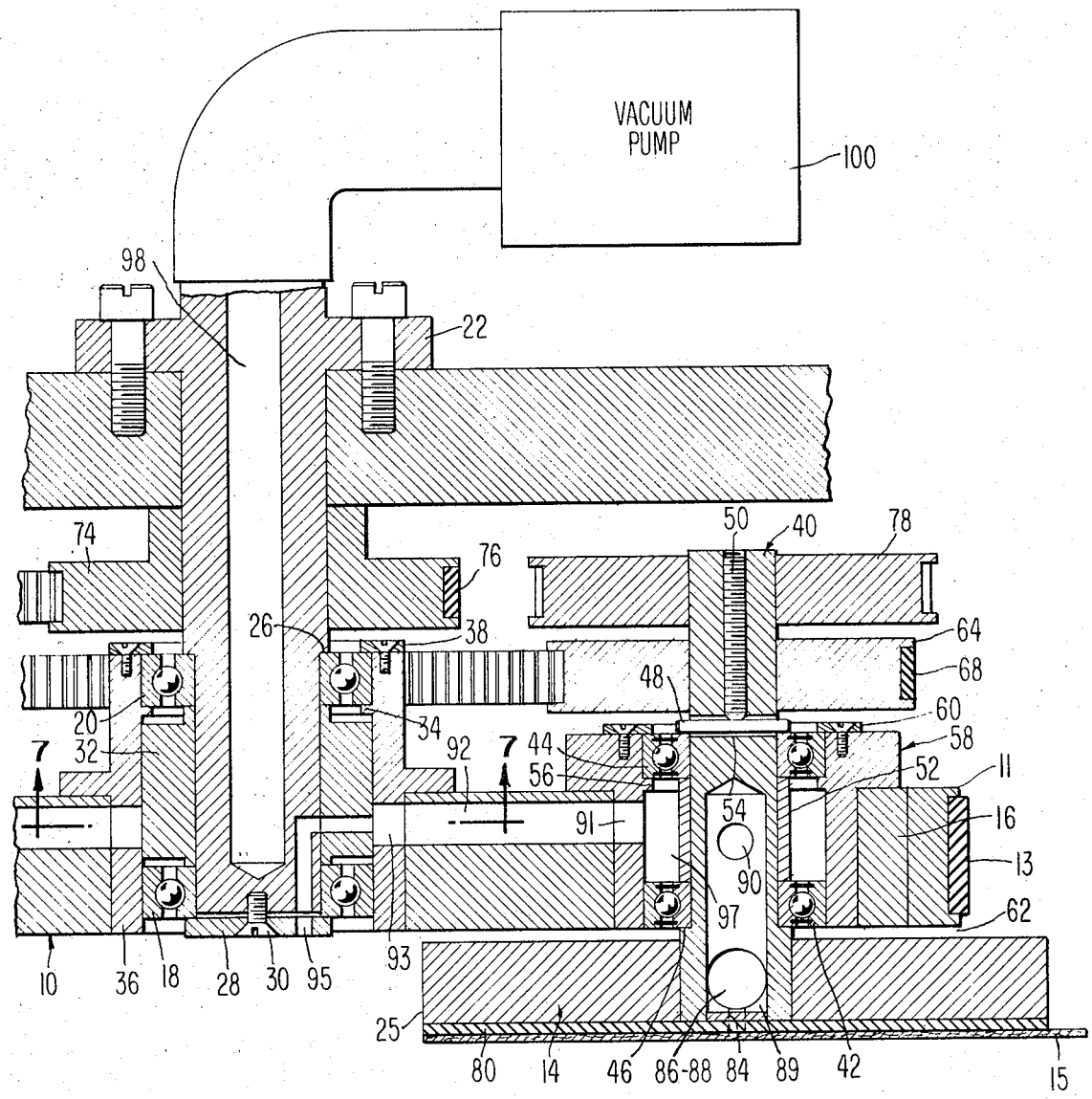
FIG. 6 is an enlarged section view taken along lines 6—6 of FIG. 4 to more clearly illustrate the vacuum venting passage configuration.
Figure 7:
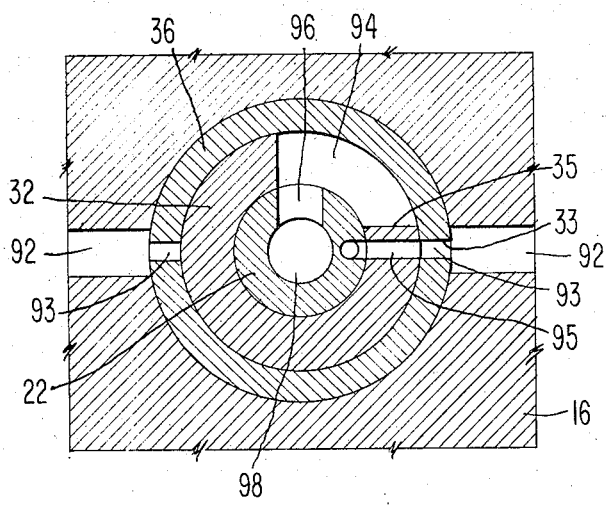
FIG. 7 is a section view taken along lines 7—7 of FIG. 6 illustrating the vacuum porting arrangement of the device as it appears at the document "output" point.

With reference to FIGS. 6 and 7, the document "output" point is determined by the arc subtended by the sector-like opening 94. In the present example, vacuum pressure on the document is desired for a 90° rotation of wheel 16. As seen in FIG. 7, the trailing edge 33 of aperture 93 (with reference to the assumed clockwise motion of wheel 16) is now aligned with edge 35 of opening 94, thereby closing the vacuum path to pump 100 and releasing the document from the platen face. Aperture 93 is preferably rectangular, rather than circular, and has its narrow dimension in the circumferential direction of housing 36 to minimize the transit time between the period of full vacuum pressure to complete pressure cut off.

With specific reference to FIG. 6, at the document "output" point, a vacuum venting path is created to dissipate any residual vacuum which may be present at the platen face after vacuum cut off and while the document is still attached. Commencing with the platen face ports 84, the path follows apertures 86, 88, 89, 90, 97, 91, 92, 93 and venting passage 95. Passage 95 has one of its pair of extremities in sleeve 32 at a point aligned with aperture 93 in housing 36, and proceeds within the sall of shaft 22, through end cap 28 to its second extremity at a point external to the wheel assembly 10. As the wheel 16 continues to rotate clockwise, the venting to atmosphere continues for an angular rotation determined by the dimension of aperture 93 adjacent the first extremity of passage 95. The purpose of the venting is to eliminate any possible partial vacuum between the platen 14 and housing 36, which might exist at instantaneous vacuum cut-off. Such partial vacuum, if present, might create an undesirable slight holding force on the document at the 90° output point. Venting to atmosphere in the manner described hereinbefore insures that document skewing as it leaves a platen will be negligible.

It has been noted herein that a variety of direction changes and document orientations may be effected by the present invention. The sides of the document 15 may be identified respectively as in FIG. 1 by the reference letters a, b, c, and d. In the direction change described hereinbefore the document was assumed to have been transported in a horizontal direction (from left to right in FIG. 1) with its "c" edge leading — entering the changer at the 0° position of the clockwise rotating wheel 16. The output direction of the document was vertically downward, with its "d" edge leading at the 90° wheel position. By changing the arc of the sector opening 94 and assuming the same input conditions, an output direction, namely, horizontally from right to left in FIG. 1 with the document "a" edge leading is possible at the 180° wheel position. With further modification of the sector opening 94, another output direction, namely, vertically upward with the document "b" edge leading is possible at the 270° position of wheel 16.

A modification of the invention involves the removal of the timing belts and pulleys, and the provision of platen shafts non-rotatably mounted on the wheel assembly. The input documents to such a device will be changed in direction thereby, but their leading edge orientation in the output directions will remain the same. Thus, if as in the rotating platen device, the document enters horizontally with its "c" edge leading, then the document output directions at the 90°, 180° and 270° wheel positions will be the same as those previously described, but the document "c" edge will be leading in each case.

Actually, if document orientation as that provided by the independently rotating platens is not required, the fixed platen device could be employed to effect an output at any wheel angle from 0° to approximately 270°. This is true because the vacuum wheel concept is based upon the idea of exiting documents from the wheel in a tangential direction with a document edge aligned perpendicular to this direction. The exiting direction must then be coincident with the tangential direction of the wheel in order to fulfill this condition. It is apparent that if the wheel platens are non-rotating, the document edge entering the platen is maintained in a tangential direction with wheel motion at all times — hence the possible document exiting at any angle between 0° and approximately 270°.

Another embodiment suggested by the present invention involves the removal of the belt and pulley means for rotating the platens, and substituting a fixed gear fastened to the wheel assembly shaft 22 in place of pulley 74, and a gear on each of the platen shafts 40 and 70, arranged to engage the aforementioned fixed gear in an epicycloidal configuration. Rotation of the wheel assembly by means of pulley 11 and belt 13, causes the platens to rotate about their centers in accordance with the selected gear ratios in the epicycloid train. A variety of document orientations is possible with this configuration at the 90°, 180° and 270° output positions of the wheel.

Other modifications of the embodiments described herein are possible within the scope and teaching of the present invention. For example, it may be desirable in some applications to employ one platen, instead of the pair shown. Alternately, more than two platens may be used. For example, in high speed applications, the use of three platens may be desirable since it results in a one-third reduction in the rotating speed of the wheel for the same platen peripheral velocity. The three platens are equally spaced, and the arc distance at the center of the platen radius therebetween is equal to the pitch spacing (distance from the trailing edge of the leading document to the trailing edge of the following document) between the incoming documents. The three platens should be linked by a timing belt, and one of the platen timing pulleys would be linked by a timing belt to a fixed pulley on the wheel assembly shaft, in the same manner as in the two-platen embodiment.

Other changes and modifications to the device taught herein may be required to suit particular requirements. Insofar as these are not departures from the true scope of the invention, they are intended to be covered by the claims appended hereto.

What is claimed is:

1. A vacuum wheel device for changing the direction of a moving document through a desired angle substantially within the same plane comprising:
   a wheel assembly rotatably mounted on a stationary shaft having a hollow center portion adapted to be coupled to a source of vacuum pressure,
   at least one platen affixed to a shaft having a hollow center portion, the platen shaft being mounted on said wheel assembly for rotation therewith, said platen having an apertured face portion adapted to contact said document at a predetermined input point, a passage within said platen connecting the aperture in said face portion to the hollow center portion of said platen shaft,
   a nonrotating sleeve member affixed to the wheel assembly shaft and having a sector-like opening disposed therein, an aperture in a wall of said last mentioned shaft leading from said hollow center portion thereof to said sector-like opening,
   a substantially radial passageway in said wheel assembly adapted to rotate therewith and having one of its pair of extremities at the hollow center portion of said platen shaft, and its other extremity at said sector-like opening,
   said sector-like opening in said sleeve being so oriented with respect to said radial passageway that initial alignment of the latter with the former occurs at said predetermined input point during rotation of said wheel assembly, thereby completing a path for said vacuum pressure and permitting said pressure to be applied to said document positioned adjacent the face portion of said platen,
   the arc subtended by said sector-like opening being such that with continued rotation of said wheel assembly subsequent to the attainment of said input point, said vacuum pressure is maintained until said platen and the document attached thereto reach a document output point corresponding to said desired angular direction change,
   said radial passageway and said sector-like opening being misaligned at said output point such that the path for said vacuum pressure is closed thereby, the termination of said vacuum pressure on said document permitting the release thereof at said output point.

2. A direction-changing device as defined in claim 1 further including a venting passage leading from the external surface of said wheel assembly to said radial passageway, said radial passageway being aligned with said venting passage at said document output point and providing a venting to atmosphere of any residual vacuum pressure present at the face of said platen at the termination of said pressure.

3. A direction-changing device as defined in claim 2 further characterized in that said platen shaft is rotatably mounted on said wheel assembly, whereby said platen is capable of independent rotation, and means coupled to said last-mentioned shaft for causing a desired rotation thereof concurrent with the rotation of said wheel assembly.

4. A direction-changing device as defined in claim 3 wherein said means for causing a desired rotation of said platen shaft comprises first and second toothed pulleys attached respectively to the shafts of said platen and said wheel assembly and a toothed belt linking said first and second pulleys.

5. A direction-changing device as defined in claim 4 wherein the physical relationship of said first and second pulleys is such that for any given angular rotation of said wheel assembly in one direction, said belt linking said pulleys will cause said platen to rotate by an equal angle in the opposite direction.

6. A direction-changing device as defined in claim 5 wherein said desired directional change is 90°, said document entering said device in a substantially horizontal direction parallel to its lengthwise axis at said input point and exiting said device in a vertical direction parallel to its widthwise axis at said output point.

7. A direction-changing device as defined in claim 6 further characterized in that the face portion of said platen is comprised of high frictional material having a plurality of interconnected elongated slots with at least one aperture therein.

8. A direction-changing device as defined in claim 7 further characterized in that said wheel assembly includes a toothed pulley attached to its periphery and drive belt means linked to said last-mentioned pulley and being operatively connected to effect rotation of said wheel assembly.

9. A direction-changing device as defined in claim 8 further including a rotating brush assembly positioned at said input point in close proximity to said platen to assure intimate contact of the document with the platen at the inception of vacuum pressure.

10. A direction-changing device as defined in claim 1 wherein said device includes a pair of platens spaced 180° apart, each of said platens being affixed to a hollow shaft rotatably mounted on said wheel assembly, each of said platens being capable of independent rotation about its center,
    a pair of first timing pulleys attached respectively to the platen shafts, a first timing belt linking said first timing pulleys,
    a pair of second timing pulleys attached respectively to the shaft of one of said platens and the stationary shaft of said wheel assembly, and a second timing belt linking said second timing pulleys.

* * * * *